Aug. 20, 1940. W. B. ANDERSON Re. 21,535

REFRIGERATION APPARATUS

Original Filed May 28, 1937 2 Sheets-Sheet 1

WITNESSES:
W. M. Van Siver
E. Lutz

INVENTOR
WILLIAM B. ANDERSON.
BY H. A. Steuger
ATTORNEY

Aug. 20, 1940. W. B. ANDERSON Re. 21,535

REFRIGERATION APPARATUS

Original Filed May 28, 1937 2 Sheets-Sheet 2

WITNESSES:
W. M. Van Sciver
E. Lutz

INVENTOR
WILLIAM B. ANDERSON.
BY W. A. Steuger
ATTORNEY

Reissued Aug. 20, 1940

Re. 21,535

UNITED STATES PATENT OFFICE 21,535

REFRIGERATION APPARATUS

William B. Anderson, West Springfield, Mass., assignor to Westinghouse Electric & Manufacturing Company, East Pittsburgh, Pa., a corporation of Pennsylvania Original No. 2,159,417, dated May 23, 1939, Serial No. 145,175, May 28, 1937. Application for reissue May 29, 1940, Serial No. 337,929

4 Claims. (Cl. 62—116)

My invention relates to refrigeration apparatus, and particularly to refrigeration apparatus of the domestic or household type.

It is an object of my invention to improve the appearance of domestic refrigerator cabinets and to provide a novel and improved ensemble of the cabinet and various parts of the operating mechanism of the refrigerator.

It is still another object of my invention to provide an improved temperature control device wherein the manually operable member for changing the setting of the cold control is in a novel, convenient, and readily accessible location.

It is a further object of my invention to provide a refrigerator cabinet wherein the refrigerating mechanism is housed in a compartment below the food storage compartment and wherein a novel arrangement of control mechanism is provided which is less expensive to manufacture and is as available and pleasing in appearance as refrigerator cabinets wherein the control mechanism, including the manual adjustment therefor, is disposed within the food storage compartment.

It is still a further object of my invention to provide a refrigerator cabinet wherein the refrigerating mechanism is disposed below the food storage compartment and in which the manually operated cold control adjusting device is concealed except when the refrigerator cabinet door is open and in which the control mechanism is mounted outside of the food storage compartment.

These and other objects are effected by my invention as will be apparent from the following description and claims taken in connection with the accompanying drawings, forming a part of this application, in which:

Figure 1:
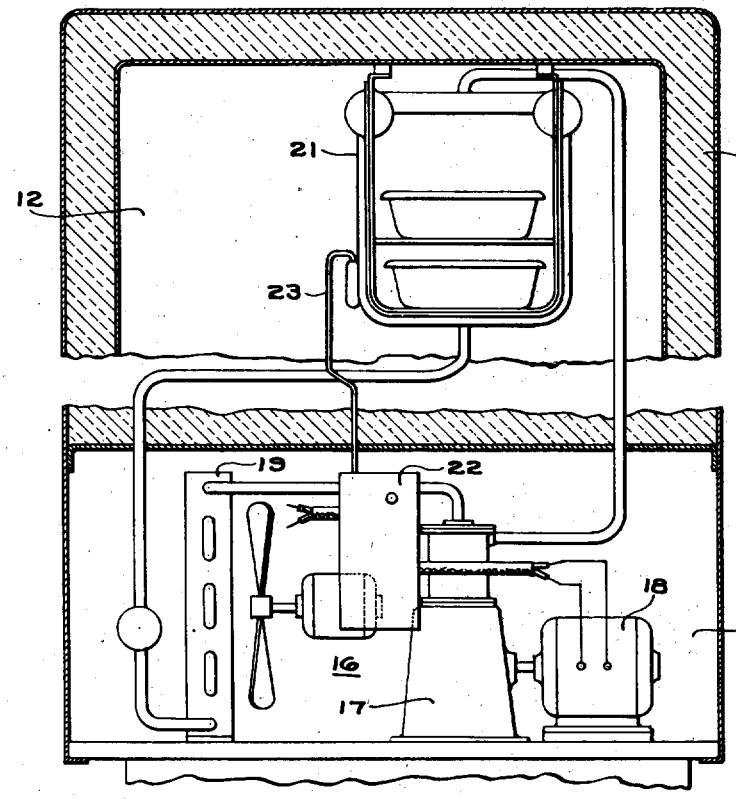
Fig. 1 is a diagrammatic view of a refrigerating machine and portions of a cabinet both of a type used in household refrigerators.
Figure 2:
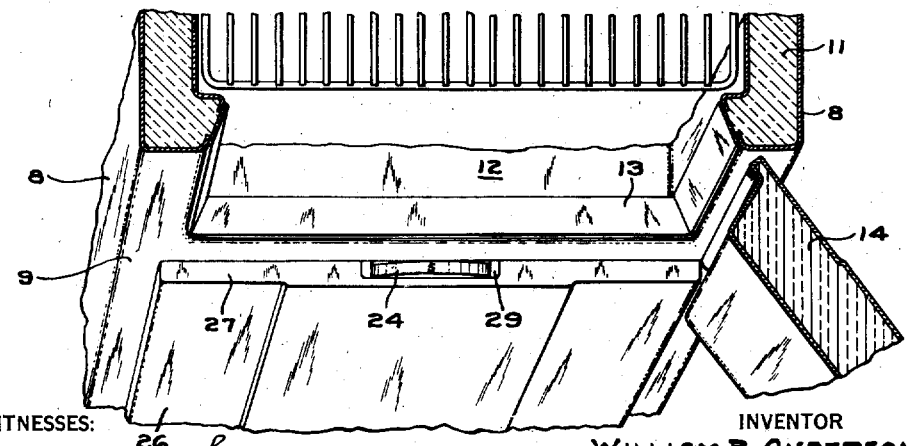
Fig. 2 is a sectional perspective view illustrating my invention as applied to the refrigerator cabinet.
Figure 3:
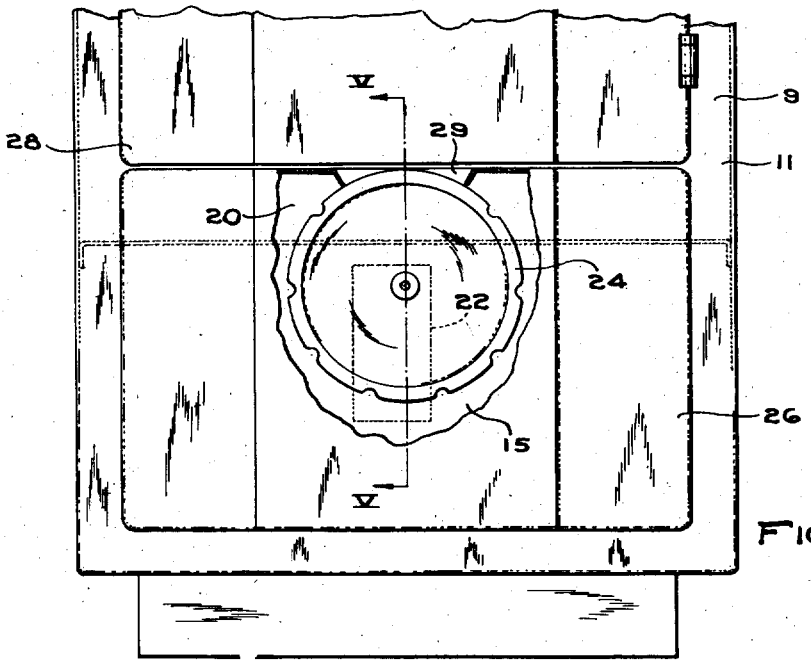
Fig. 3 is a partial front elevational view of the apparatus shown in Fig. 2.
Figure 4:
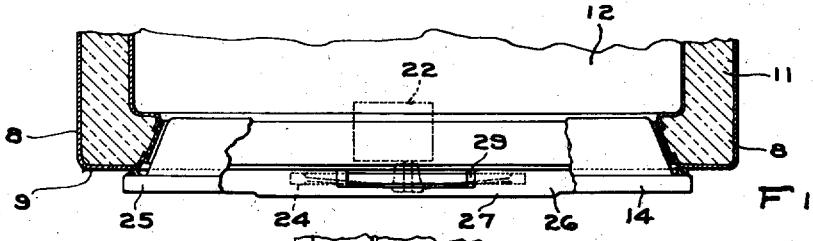
Fig. 4 is a top view of a portion of the refrigerator cabinet shown in Figs. 2 and 3, with parts of the access door broken away for the sake of clearness; and, Fig. 5 is a sectional view taken on line V—V of Fig. 3.
Figure 5:
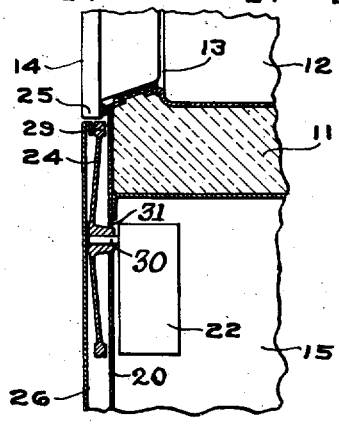

Referring specifically to the drawings for a detailed description of my invention, numeral 11 designates generally a refrigerator cabinet having vertical side walls 8 and a vertical front wall 9. The cabinet 11 forms a food storage compartment 12 having an access opening 13 at the front thereof and provided with a door 14 for closing the access opening. The cabinet 11 also embodies a lower machinery compartment 15 in which a condensing unit 16, comprising a compressor 17, motor 18, and air cooled condenser 19 are disposed. An evaporator 21 is disposed in the food storage compartment 12 for cooling the same, and is connected by suitable conduits to the condensing unit 16, in a manner well known in the art. A temperature control switch or cold control, diagrammatically shown at 22, regulates the operation of the condensing unit 16 in response to evaporator temperatures through a thermal responsive gas filled tube 23 (Fig. 1) also in a manner well understood in the refrigerator art. The setting of the temperature control switch may be varied by the user by means of a manually operable controller 24, shown herein as a relatively large disk, which disk has indicia marked on its perimeter, as shown in Fig. 2, so that the user may determine the temperature setting at a glance by reference to the position of the manually operable disk 24. All of the foregoing apparatus is substantially embodied in the refrigerators now in general use but I do not intend to be limited to particular arrangements of the parts or to the particular type of condensing unit and control described, except as specifically set forth in the appended claims.

In accordance with my invention, as best shown in Figs. 2 to 5, inclusive, the door 14 is provided with a flange 25 which overlaps and extends outwardly from the front of the cabinet 11 a short distance. The machinery compartment 15 is closed at its front, as shown at 20 and a panel member 26 is provided for the closed front. The panel member 26 extends outwardly flush with the door, as shown in Figs. 1 and 2, the horizontally extending top 27 thereof lying closely adjacent to the bottom 28 of the door and in substantial alignment with the bottom of the food storage compartment 12. An aperture 29 is disposed in the top 28 of the panel member 26.

The temperature control device 22 is disposed in the machinery compartment 15, and the manually operable member 24 is so disposed between the closure 20 and the panel member 26 that it extends slightly into the aperture 29. The disk 24 is connected to the control device 22 by a shaft 30 extending through an opening 31 in the closure 20. The disk 24 is quite large and indicia is spaced around it so that only one numeral will be in view through the aperture 29 when the numeral is substantially centrally located in the aperture. Obviously, the disk 24 is rotatable normally through the aperture 29 to change the control setting of the control device 22 and adjust the temperature of the evaporator 21. However, the disk 24 is visible and accessible for operation only when the food compartment door 14 is open, and at other times is concealed by the panel member 26 for the machinery compartment, and by the door 14.

From the foregoing, it will be apparent that I have provided refrigeration apparatus of improved appearance, wherein the manually operated temperature control, while readily accessible for inspection and operation, is well protected from bumps or operation by unauthorized persons. Furthermore, the temperature control device is disposed in the machinery compartment, where problems of mounting or freezing of parts of the control, such as sometimes occur when the temperature control is disposed in the food storage compartment are overcome, while the disk 24 is disposed in an accessible position.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In refrigeration apparatus, the combination of a refrigerator cabinet embodying an upper food storage compartment and a lower machinery compartment, an access door for said food storage compartment, said cabinet having vertically extending front and side walls and an intermediate substantially horizontally extending surface located on the front wall near the bottom portion of the food storage compartment, a refrigerant condensing unit disposed in the machinery compartment, a control for automatically starting and stopping the condensing unit so as to maintain a desired refrigerated temperature in the food storage compartment, and a manually operated member for adjusting the control so as to obtain maintenance of different desired temperatures in the food storage compartment, said manually operated member being concealed behind the front wall of the cabinet beneath the food storage compartment and said intermediate horizontally extending surface having an opening provided therein for affording access to the adjusting member from above, said manually operated member being adjustable only when said access door is open.

2. In refrigeration apparatus, the combination of a refrigerator cabinet embodying an upper food storage compartment and a lower machinery compartment, said food storage compartment having an access opening therein and a door for closing said access opening, said cabinet having vertically extending front and side walls and a horizontally extending ledge provided on the front wall of the cabinet below said access door, a refrigerant condensing unit disposed in the machinery compartment, a control for automatically regulating the operation of the condensing unit to maintain a desired refrigerated temperature in the food storage compartment, and a manually operated member for adjusting the control so as to obtain maintenance of different desired temperatures in the food storage compartment, said manually operated member being concealed behind the front wall of the cabinet beneath the food storage compartment and said ledge having an opening therein for affording access to the adjusting member from above.

3. In refrigeration apparatus, the combination of a refrigerator cabinet embodying an upper food storage compartment and a lower machinery compartment, an access door for said food storage compartment, said cabinet having vertically-extending front and side walls and an intermediate substantially horizontally-extending surface located on the front wall near the bottom portion of the food storage compartment, a refrigerant condensing unit disposed within the machinery compartment, a control for automatically starting and stopping the condensing unit so as to maintain a desired refrigerator temperature in the food storage compartment, and a manually-operated member for adjusting the control so as to obtain maintenance of different desired temperatures in the food storage compartment, said manually-operated member being at least partially concealed behind the front wall of the cabinet beneath the food storage compartment and said intermediate horizontally extending surface having an opening provided therein into which said manually-operated member extends, said manually-operated member being accessible for adjustment only when said access door is open.

4. In refrigeration apparatus, the combination of a refrigerator cabinet embodying an upper food storage compartment and a lower machinery compartment, said food storage compartment having an access opening therein and a door for closing said access opening, said cabinet having vertically-extending front and side walls and a surface extending inwardly of the front wall of the cabinet adjacent the bottom of said access door, a refrigerant condensing unit disposed in the machinery compartment, a control for automatically regulating the operation of the condensing unit to maintain the desired refrigerator temperature in the food storage compartment, and a manually-operated member for adjusting the control so as to obtain maintenance of different desired temperatures in the food storage compartment, said inwardly-extending surface having an opening therein into which said manually-adjustable member extends.

WILLIAM B. ANDERSON.